US006193825B1

(12) United States Patent
Dolan

(10) Patent No.: US 6,193,825 B1
(45) Date of Patent: Feb. 27, 2001

(54) METHOD AND APPARATUS FOR MOISTENING ENVELOPE FLAPS

(75) Inventor: Donald T. Dolan, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/221,895

(22) Filed: Dec. 28, 1998

(51) Int. Cl.[7] ........................... B32B 31/12; B65C 11/04; B05C 7/00; B05C 11/02; B05D 7/12

(52) U.S. Cl. ........................... 156/64; 156/356; 156/357; 156/362; 156/363; 156/378; 156/578; 118/313; 118/323; 118/712; 427/8; 427/284; 427/285; 427/421

(58) Field of Search ......................... 156/356, 64, 441.5, 156/308.4, 308.6, 308.8, 578, 378, 357, 360, 362, 363; 239/4, 102.2; 118/313, 314, 315, 323, 712; 427/421, 8, 284, 285, 288

(56) References Cited

U.S. PATENT DOCUMENTS

| | | | |
|---|---|---|---|
| 3,911,862 | 10/1975 | Lupkas | 118/7 |
| 4,873,941 | 10/1989 | O'Dea | 118/669 |
| 4,924,804 | 5/1990 | O'Dea et al. | 118/669 |
| 4,924,805 | 5/1990 | O'Dea | 118/680 |
| 5,007,371 | 4/1991 | O'Dea et al. | 118/680 |
| 5,098,734 | 3/1992 | O'Dea et al. | 427/8 |
| 5,252,353 * | 10/1993 | DiGiulio | 427/8 |
| 5,527,418 * | 6/1996 | Ginsberg | 156/443 |
| 5,665,198 * | 9/1997 | Bieber | 156/578 |
| 5,681,757 * | 10/1997 | Hayes | 437/7 |
| 5,740,728 * | 4/1998 | DeBarber | 101/93 |
| 5,813,327 | 9/1998 | Freeman et al. | 101/93 |
| 5,840,123 * | 11/1998 | Holbrook | 118/603 |

* cited by examiner

*Primary Examiner*—Richard Crispino
*Assistant Examiner*—J. A. Lorengo
(74) *Attorney, Agent, or Firm*—Alberta A. Vitale; Angelo N. Chaclas; Michael E. Melton

(57) ABSTRACT

This invention overcomes the disadvantages of the prior art by providing an accurate moistening system which provides for less fluid waste and better wetting. This in turn causes better sealing of the envelope flap. The present invention is directed to, in a general aspect, a non-contact envelope flap moistening system which can be installed in a mailing machine apparatus. The flap moistening system comprises an array of inkjet print heads and a document scanner for sensing the envelope flap. Envelope flaps can be moistened by the flap moistening system by performing a method comprising the following steps: sensing the envelope flap; profile and/or the glue area of an envelope flap; building a firing sequence for the print head nozzles; and actuating the nozzles to precisely fire discreet fluid droplets onto the glue area of the envelope flap. The system provides precise fluid amounts for envelope sealing. This invention overcomes the disadvantages of the prior art by providing an accurate moistening system which provides for less fluid waste and better wetting.

12 Claims, 4 Drawing Sheets

METHOD AND APPARATUS FOR MOISTENING ENVELOPE FLAPS

FIELD OF THE INVENTION

The invention disclosed herein relates generally to a method and apparatus for moistening gummed envelope flaps and, more particularly to a method and apparatus for precision application of moisture to gummed envelope flaps using inkjet print heads.

BACKGROUND OF THE INVENTION

Envelope flap moistening systems generally fall into two categories, contact and non-contact moistening systems. Contact systems generally deposit moisture onto an envelope flap by contact with a wetted substrate. Non-contact systems generally spray moisture onto the envelope flap. In non-contact flap moistening systems, envelope flap moistening has been performed with nozzle and pump systems. The pump which is connected to a reservoir is also connected to spray nozzles. A solenoid actuated valve can be placed between the pump and the nozzle(s) to control spraying.

Some non-contact systems with pump(s) and nozzles rely on leading edge sensors and a time lag for compensating for the distance between the nozzle and the leading edge sensor for spraying fluid onto the glue area of the envelope flap. This method can be imprecise, spraying fluid onto an incorrect place on the envelope. Also, since the systems have few nozzles, they are not highly accurate. Other sensing systems, such as systems comprising an envelope sensor and a flap sensor, are designed to sense limited flap profiles, such as, profiles of no. 10 envelope flaps.

Other non-contact systems can have several nozzles. The nozzles which are not highly accurate produce considerable over-spray which can wet portions of the envelope flap which do not have a glue area and can also wet the contents of the envelope. The inaccuracy of some non-contact systems may also cause over spraying and/or miss portions of the flap, thus requiring a fluid collection means for collecting unused fluid. The size of the nozzles prohibits a larger number of nozzles to be placed in a small area of a mailing machine which is in alignment with an envelope flap path. Thus, an array of nozzles can be large and difficult to implement into a mailing machine. An example of a non-contact system is a pump and nozzle system. The amount of fluid that pump and nozzle systems use is large since the nozzles spray in a continuous manner, are imprecise and also over-spray.

Pump and nozzle systems can also require a large amount of space in the systems in which they are mounted. These pump systems usually include a pump and motor, and as such, they can be large and difficult to locate in the space available. Pumps, such as piston driven pumps, are difficult to control. Due to the response time of the system, the piston must start prior to the time the spray is desired, and must stop earlier than desired because the spray will continue after the piston stops due to inertia and system elasticity. In multiple nozzles systems, typically one pump supplies fluid to the nozzles and all of the nozzles are "on" or "off" simultaneously. The response time for spraying in a system that uses a pressurized fluid supply, a solenoid control valve, and spray nozzles is limited by the system's ability to pump fluid to the required place at the required time. The systems are dependent upon solenoid actuated valves which have a physical upper frequency limit of 200 to 500 Hz. The nozzles supply moisture in a continuous spray; therefore, controlling the amount of fluid applied to an envelope flap is not precise.

Thus, one of the problems of the prior art is that the nozzle and pump systems do not provide accurately metered amounts of fluid; therefore, over-wetting and under-wetting of the envelopes moistened by these systems results in poor, delayed or no sealing. Another problem of the prior art is that nozzle and pump flap moistening systems, which generally have one to three nozzles are only as precise as the number of nozzles allow. Another problem of the prior art is that nozzle and pump systems use more fluid than is necessary to moisten the glue area of an envelope flap. Another problem of the prior art is that response speed of nozzle and pump systems is limited. Another problem of the prior art is that limited flap profiles can be sensed by any one system, or multiple sensor systems are needed to sense numerous flap profiles. Another problem of the prior art is that continuous spray nozzles provide for poor moisture control. Another problem of the prior art is that over-spray requires fluid collection systems and causes wetting of envelope contents.

SUMMARY OF THE INVENTION

This invention overcomes the disadvantages of the prior art by providing an accurate moistening system which provides for less fluid waste and better wetting. This in turn causes better sealing of the envelope flap. The present invention is directed to, in a general aspect, a non-contact envelope flap moistening system which can be installed in a mailing machine apparatus. The flap moistening system comprises an array of inkjet print heads and a document scanner for sensing the envelope flap. Envelope flaps can be moistened by the flap moistening system by performing a method comprising the following steps: sensing the envelope flap profile and/or the glue area of an envelope flap; processing the sensed information; building a firing sequence for the print head nozzles; and actuating the nozzles to precisely fire discreet fluid droplets onto the glue area of the envelope flap. The system provides precise fluid amounts for envelope sealing.

Thus, an advantage of the method of the present invention is that it requires less fluid to accomplish flap moistening. Another advantage of the present invention is that it more precisely places fluid on an envelope flap. Another advantage of the present invention is that it performs better sealing. Another advantage of the present invention is that it seals envelope flaps quickly. Another advantage of the present invention is that it does not require separate nozzle and pump apparatus. Another advantage of the present invention is that the scanning and inkjet components are compact and do not have moving parts. Another advantage of the present invention is that it has high response time. Other advantages of the invention will in part be obvious and will in part be apparent from the specification. The aforementioned advantages are illustrative of the advantages of the various embodiments of the present invention.

DETAILED DESCRIPTION OF THE PRESENT INVENTION

Figure 1A:
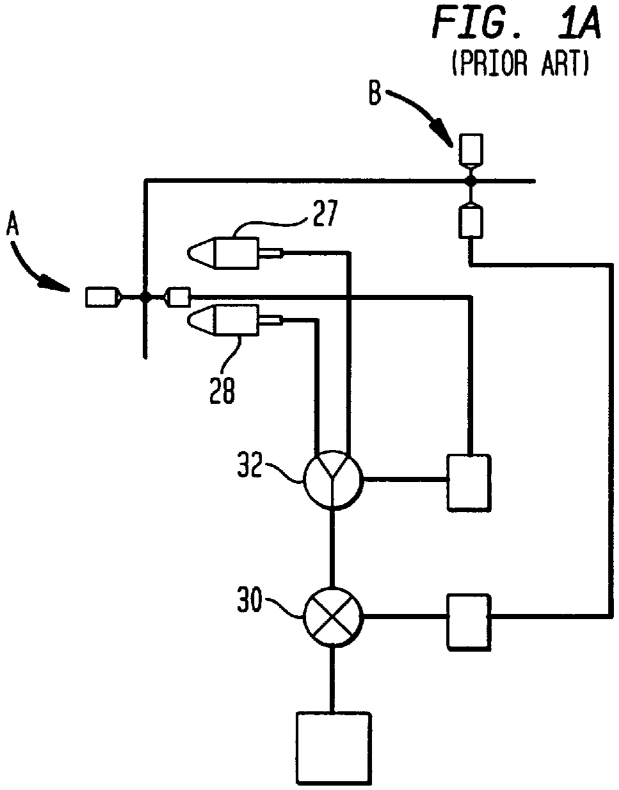
FIG. 1A (PRIOR ART)
FIG. 1*a* is a schematic diagram of a prior art system employing multiple nozzles, a pump and a solenoid actuated valves for envelope flap moistening.
Figure 1B:
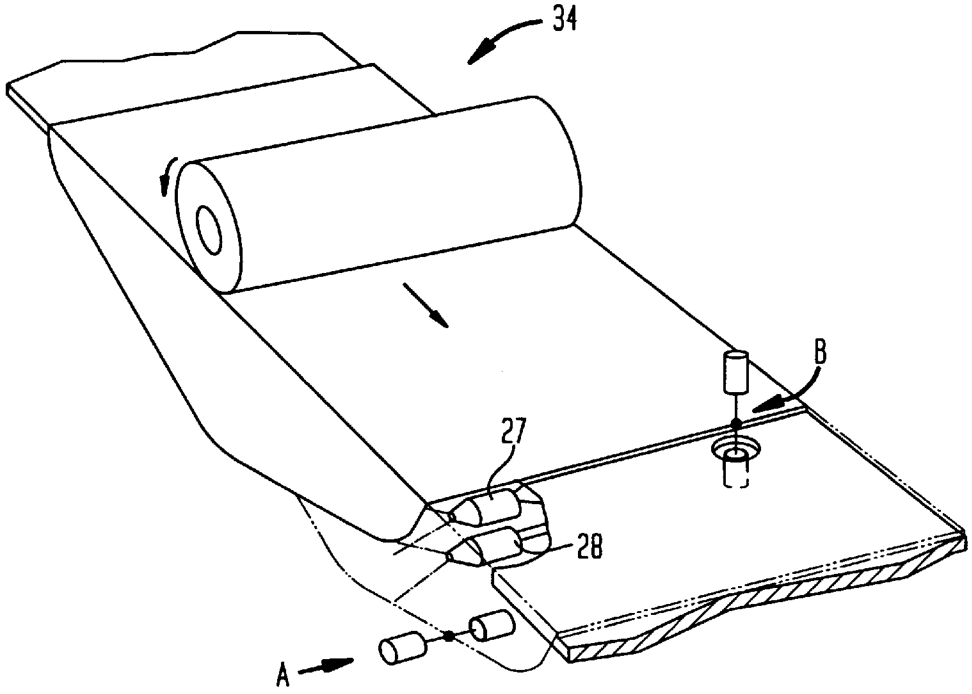
FIG. 1B (PRIOR ART)
FIG. 1*b* is perspective view of a prior art system showing placement of the nozzles in a mailing machine apparatus.

FIG. 1*a* is schematic diagram of a prior art system employing multiple nozzles 27 and 28, a pump 30 and a solenoid actuated valve 32 for envelope flap moistening. FIG. 1*b* is perspective view of a prior art system showing placement of the nozzles in a mailing machine apparatus 34. The large nozzles and are non-precision firing nozzles and spray a continuous spray of fluid. Additionally, the large nozzles cause over-spray and wet portions of the envelope, such as the contents, which should not be wetted. The over-spray must be collected which requires a fluid collection system such as a tray beneath the nozzles. Because of the over-spray, more fluid is used than is necessary to wet the envelope flap. The large nozzles have limited resolution of approximately 5 nozzles per inch. The spray frequency response is on the order of 200 to 500 Hz. which, if used in the on-off mode, limits the horizontal resolution of the sprayed areas, resulting in large gaps between sprayed areas. Since this is not desirable, these systems are used in the continuously-on mode while spraying the flap and are only turned off as the gap between envelopes passes. Another factor contributing to the reduced response is the elasticity of the feed tube connecting the nozzle(s) 27, 28 to the pump 30; after the valve 32 is actuated to turn off flow to the nozzle(s), fluid remains in the feed tube, the fluid can be pushed to the nozzles 27, 28 by the elasticity of the tube, and/or inertia of the fluid. The envelope sensing system, including envelope flap sensor A and envelope sensor B, has limited resolution capability and is designed for sensing limited flap profiles.

In describing present invention, reference will be made herein to FIGS. 2–4 of the drawings in which like numerals refer to like features of the present invention.

Figure 2:
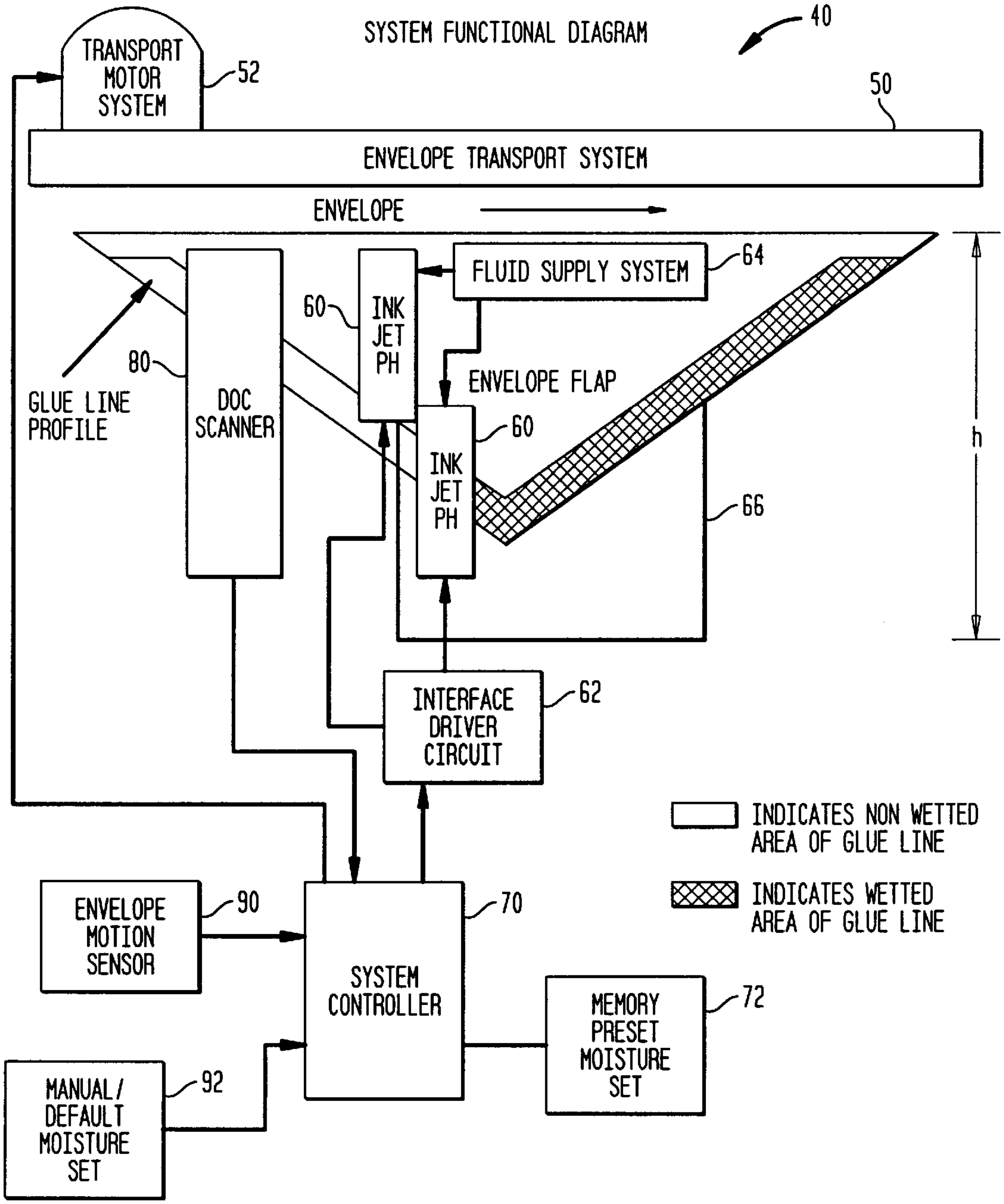
FIG. 2 is a system functional diagram of one embodiment of the apparatus of present invention illustrating components of a system employing inkjet print heads for flap moistening.

FIG. 2 is a system functional diagram of one embodiment of the apparatus of present invention illustrating components of a non-contact system employing inkjet print heads for flap moistening. The system comprises an envelope transport system 50 with a transport motor system 52; inkjet print heads 60 and interface driver circuit 62; a fluid supply system 64; a system controller 70; a document scanner 80 connected to the system controller 70; an envelope motion sensor 90; and a memory 72 for preset moisture settings. The system controller 70 comprises a scanner to processor and envelope motion controller and determines a firing sequence. The system controller can receive signals comprising envelope motion sensor signals, manual or default moisture settings and/or preset moisture settings. In the preferred embodiment the interface driver circuit 62 is an integrated circuit which processes information from the system controller 70. The system controller 70 can be an integrated circuit or a central processing unit (CPU). The envelope flap moistening system can be installed in a mailing machine apparatus, such as, a mailing machine disclosed in U.S. Pat. No. 5,740,728 which is assigned to the assignee of the present invention and is herein incorporated by reference. The envelope transport system can be, for example an article transport apparatus, such as, the article transport apparatus disclosed in U.S. Pat. No. 5,813,327 which is assigned to the assignee of the present invention and is herein incorporated by reference.

The embodiment is configured such that the inkjet print heads and the document scanner are adjacent to one another and the height of the document scanner and the inkjet print heads is approximately height h. The height h is equal to the maximum envelope flap height of standard envelope(s), which is approximately 4 inches. In this configuration, the flap moistening system apparatus 40 moistens most flap profiles for a variety of envelope sizes. The document scanner 80 comprises a light source, a lens and sensor (not shown) integrated into the document scanner module. The document scanner 80 can be a PI200MC-C module manufactured by Peripheral Imaging Corporation of San Jose, Calif. The document scanner has high accuracy of about 200 to 300 dpi. The document scanner 80 is able to scan a variety of envelope profiles and is connected to a system controller 70 which processes information outputted by the scanner and sends that information, along with envelope position information, to the interface driver circuit 62. The document scanner 80 could sense the glue area, such as a shiny or matte area of the envelope flap, by detecting the optical difference between the glue area and the non-glue area. The glue modifies the surface characteristics of flap material, resulting in a difference in optical response as detected by the flap profile sensor. Alternately, if the glue area is not readable, the document scanner 80 can scan the profile of the flap and the system controller 70, supplied with default information 92 regarding glue placement standards, can compute the glue line profile. A preferred print head having vertical resolution of 80 to 160 dpi, and horizontal resolution of 150 to 1500 dpi dependent upon transport speed and print head maximum frequency, can be used with the document scanner to place fluid with high accuracy onto the glue line of the flap. However, inkjet print heads with a wide range of resolution could be used, so long as the print head is capable of depositing enough fluid onto the envelope flap to cause sealing.

Figures 3A, 3B, 3C:
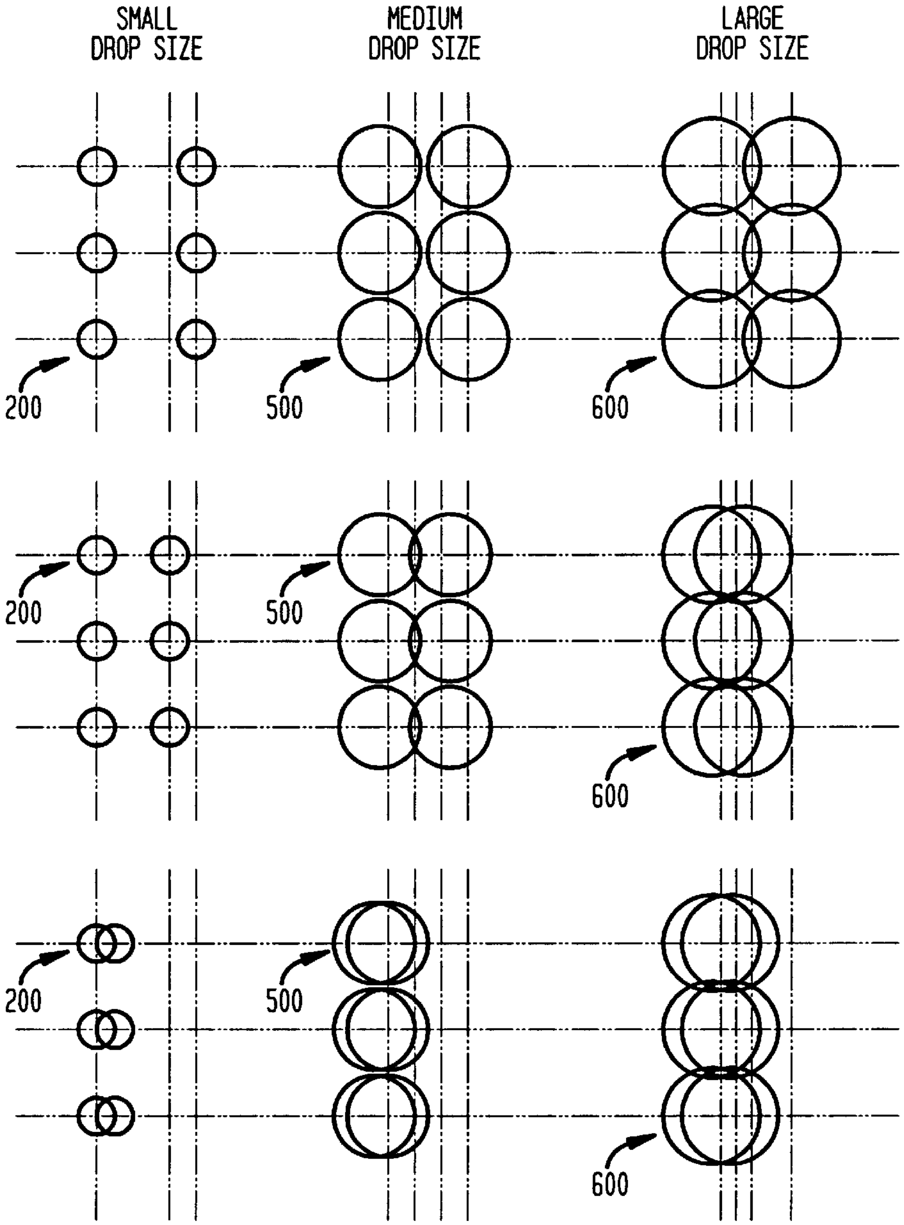
FIGS. 3*a*–3*c* illustrate inkjet deposits of small drop size 200, medium drop size 500 and large drop size 600.

FIGS. 3*a*–3*c* illustrate inkjet deposits of small drop size 200, medium drop size 500 and large drop size 600. The sizes of the drops are not drawn to scale and are exaggerated and shown with grid lines for illustration purposes. FIG. 3*c* illustrates higher horizontal resolution than FIG. 3*b* and FIG. 3*b* illustrates higher horizontal resolution than FIG. 3*a*. FIGS. 3*a*–3*c* also illustrate the use of three discreet horizontal resolutions combined with three discreet drop sizes to control the amount of fluid that can be deposited on the envelope glue area. The amount of fluid deposited on the glue area can be changed by varying, independently or in combination, the transport speed, the print head frequency or the drop size of the emitted drop. The horizontal resolution is a function of transport speed and print head frequency. The fluid control or drop size is varied by varying the voltage to the print head. The vertical resolution is fixed by the nozzle geometry of the print head.

The inkjet print heads 60 can be an array of print heads with a variety of configurations. Nozzle arrays can be offset. The inkjet print heads can be any suitable inkjet print head type, including, but not limited to, a piezoelectric diaphragm (PZT) or thermal "bubble jet". A typical configuration can include 2 to 4 print heads which range in size from 0.35 inch to 1 inch in height. The resolutions can be in the range of approximately 80 to 600 dpi. The firing frequency can be in the range of approximately 4000 to 60,000 Hz. As an example, an inkjet print head capable of printing at 30 kHz, can deposit 1000 drops per inch in the horizontal direction on an envelope moving at a linear speed of 30 inches per second. Depending on the drop size, these drops can overlap each other, or not overlap each other. The inkjet print head can be, for example, any suitable commercially available print head.

The inkjet print heads produce discrete drops of fluid, rather than a continuous spray; therefore, the inkjet system provides better performance with respect to controlling the amount of fluid applied. The density of the nozzles and the frequency of firing of the inkjets can be varied to control the amount of fluid that is applied. Because of firing accuracy, and firing of discreet droplets, less fluid is used with the moistening system and therefore, fluid is replenished in the system less frequently than in previous systems. Preferably, a fluid such as distilled water would be used in the inkjet system since there are no components in distilled water that will leave a residue and clog the inkjets. Also, other fluids which do not leave a residue may be used. This will also reduce the need to maintain the inkjet system. "sealing solution, sold under the tradename EZ-SEAL® and". sold by Pitney Bowes, Inc., the assignee of the present application, may also be used as the moistening fluid. Optionally, a wiper blade may be installed to remove paper dust from the nozzle face places. The system could use inkjet print heads which were previously rejected for other applications, such as high resolution printing, because some nozzles were not functioning. Thus, the acquisition cost of rejected print heads would be less than first quality print heads. These reduced quality print heads would still be suitable for the moistening application of the present invention.

The flap moistening system of the present invention is virtually inertialess (some inertia is present due to the fluid drops). Previous systems use tracking arms driven by servo motors to track envelope flap. As the tracking arm tracks the front flap section, it must make a sharp turn around when it reaches the middle of the flap (bottom of the "V") to track the rear portion of the envelope flap. The problem is especially acute with baronial envelopes with very pronounced "V" profiles. The result is that the tracking arm loses track of the portion of the flap just beyond the "V" and takes a distance to get back on track. The result is incomplete wetting of the glue line. The inkjet implementation of the present invention does not have the tracking problem since it does not use a tracking arm mechanism. The present invention can selectively spray the glue line at the edge of the envelope flap with the proper nozzle(s) and can accommodate any flap profile within its field of operation.

In one embodiment, the fluid supply system 64 comprises a bottle and a buffer reservoir to supply fluid to the inkjet print head(s) via a gravity feed. The system is provides fluid to the inkjet array via a hose connected to the buffer reservoir. The buffer reservoir is mounted at a height that would provided the proper fluid pressure at the print head assembly. The bottle comprises a built-in "chicken feeder" type of mechanism such that when it is inverted into the buffer reservoir, an amount of fluid is provided to fill the buffer reservoir to a specific height. As fluid is used, the "chicken feeder" re-supplies the buffer reservoir to maintain the fluid level at the specified height. Between envelopes, or at other selected times, the inkjet print head array sprays fluid into a collection trough to keep the nozzles clear and functioning. The trough may connect to a collection tray 66 (shown in FIG. 2) or a waste pad, where evaporation would keep the fluid from building up. Alternately, a bag with a needle septum or a refillable cartridge can be used to supply fluid to the inkjet print head.

Figure 4:
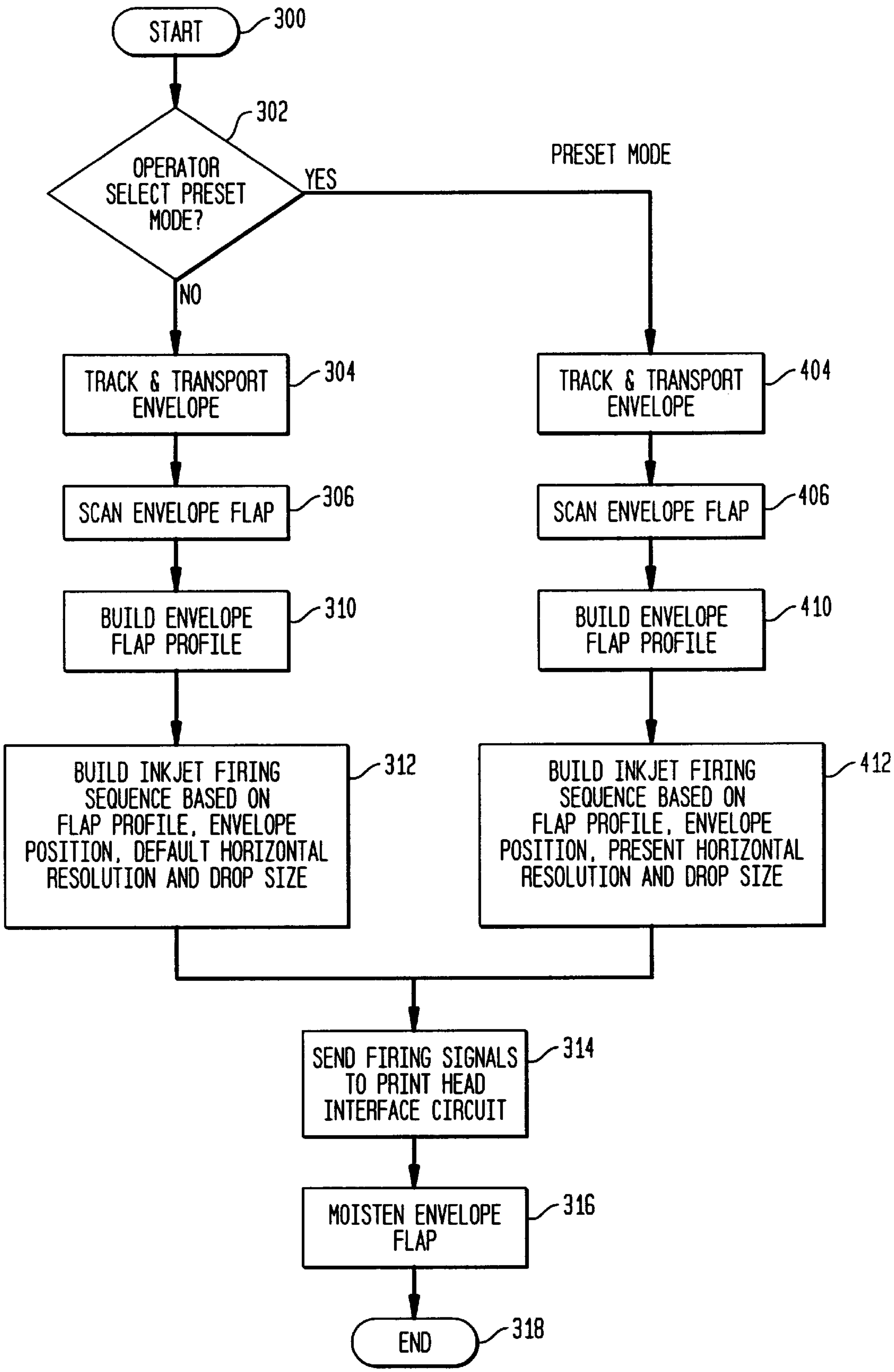
FIG. 4 is a flow chart of one embodiment of the method of the present invention, illustrating steps for flap moistening including a preset mode selection.

FIG. 4 is a flow chart of one embodiment of the method of the present invention, illustrating steps for flap moistening including a preset mode selection. At step 300, the method begins. At step 302, a query is made as to whether the operator has selected a preset mode which determines the amount of fluid to be deposited on the envelope flap. If selected, the amount of fluid to be deposited will be controlled by the system, by using a preset horizontal resolution and drop size. The operator will have the ability to select from multiple preset selections or manually select from a range of values. If the operator has not selected a mode at step 302, the envelope is tracked and transported at step 304, and scanned at step 306 and at step 310, an envelope flap profile is built. At step 312, a firing sequence is built based on the envelope flap profile, envelope position, default or manual horizontal resolution and drop size. The default horizontal resolution and drop size can be system defaults which are used when those features are not specifically selected by a user. The system can default, for example, when left idle for a specified period of time. At step 314, the firing signal is sent to the print head interface driver circuit 62. At step 316, the flap is moistened. If the operator has selected a preset mode at step 302, the envelope is tracked and transported at step 404, and scanned at step 406 and, at step 410, an envelope flap profile is built. At step 412, a firing sequence is built based on the envelope flap profile, envelope position, and preset horizontal resolution and drop size. At step 314, the firing signal is sent to the print head interface driver circuit 62. At step 316, the flap is moistened. The method ends at step 318. The preset mode can also be operate by detecting the type of envelope by its dimensions and flap profile. A table of dimensions and flap profiles can be stored in memory 72 and used to provide a proper amount of fluid to an envelope flap for a particular envelope type. The system sprays fluid onto the envelope flap for optimum sealing by selectively changing the nozzles that spray fluid and/or the frequency of spraying, and/or the drop size, and/or the transport speed of the envelope.

The preset mode comprises a horizontal resolution and drop size, stored in memory 72, which enables the application of a metered amount of fluid for optimum sealing. The horizontal resolution of the system can be set so that fluid is applied to the envelope flap in a more precise manner such that the flap does not become too moist or not moist enough to perform proper sealing. When envelope flaps are moistened too much they take longer to seal and typically, they do not seal until they are down stream, in a stacker, in the mailing machine. Another problem is that when the flaps are too moist, glue can leak onto the envelope body and cause adhesion of the envelope to another envelope below it in the stacker. If each envelope sticks to another envelope, a block of envelopes can be formed. When the flaps are moistened too little, they do not seal. The present invention provides more precise moistening in order to overcome these moistening problems.

While the present invention has been disclosed and described with reference to a single embodiment thereof, it will be apparent, as noted above that variations and modifications may be made therein. It is also noted that the present invention is not limited to moistening envelopes flaps. It is, thus, intended in the following claims to cover each variation and modification that falls within the true spirit and scope of the present invention.

What is claimed is:

1. An apparatus for applying moisture to a flap of an envelope having an envelope flap glue line, the apparatus comprising:

a sensor for sensing a flap profile of an envelope; at least one inkjet print head for selectively spraying a metered amount of fluid on the envelope flap glue line; and wherein the sensor is for sensing the envelope flap glue line.

2. An apparatus for applying moisture to a flap of an envelope having an envelope flap glue line, the apparatus comprising:

at least one inkjet print head;

a fluid supply system for supplying fluid to the inkjet print head;

an inkjet interface driver circuit;

an envelope transport system for transporting the envelope past the inkjet print heads;

a system controller for controlling the motion of the envelope in the apparatus;

an envelope position sensor for detecting the position of the envelope in the apparatus, the envelope position sensor provides signals indicative of envelope position to the system controller; and whereby the system controller processes signals indicative of the envelope position and provides firing signals to the inkjet interface driver circuit so that the inkjet print head will moisten the flap glue area by firing metered amounts of fluid on the glue area of the envelope; and wherein the envelope position sensor comprises a motor drive system for providing synchronized pulses.

3. An apparatus for applying moisture to a flap of an envelope having an envelope flap glue line, the apparatus comprising:

at least one inkjet print head;

a fluid supply system for supplying fluid to the inkjet print head;

an inkjet interface driver circuit;

an envelope transport system for transporting the envelope past the inkjet print heads;

a system controller for controlling the motion of the envelope in the apparatus;

an envelope position sensor for detecting the position of the envelope in the apparatus, the envelope position sensor provides signals indicative of envelope position to the system controller; and a document scanner for scanning the envelope flap to sense the envelope flap profile; and whereby the system controller processes signals indicative of the envelope position and provides firing signals to the inkjet interface driver circuit so that the inkjet print head will moisten the flap glue area by firing metered amounts of fluid on the glue area of the envelope.

4. An apparatus for applying moisture to a flap of an envelope having an envelope flap glue line, the apparatus comprising:

at least one inkjet print head;

a fluid supply system for supplying fluid to the inkjet print head;

an inkjet interface driver circuit;

an envelope transport system for transporting the envelope past the inkjet print heads;

a system controller for controlling the motion of the envelope in the apparatus;

an envelope position sensor for detecting the position of the envelope in the apparatus, the envelope position sensor provides signals indicative of envelope position to the system controller;

envelope position sensor for detecting the position of the envelope in the apparatus, the envelope position sensor provides signals indicative of envelope position to the system controller;

a document scanner for scanning the envelope flap to sense the envelope flap glue area; and whereby the system controller processes signals indicative of the envelope position and provides firing signals to the inkjet interface driver circuit so that the inkjet print head will moisten the flap glue area by firing metered amounts of fluid on the glue area of the envelope.

5. A method of applying moisture to a flap of an envelope having an envelope flap glue line, the method comprising the steps of:

a) tracking and transporting the envelope;

b) scanning the envelope flap;

c) building a flap profile;

d) building a firing sequence for inkjet print head for moistening a glue area of the envelope flap; and e) moistening the glue area of the flap in accordance with the firing sequence.

6. A method of applying moisture to a flap of an envelope having an envelope flap glue line, the method comprising the steps of:

a) selecting a preset horizontal resolution and preset fluid drop size;

b) scanning the envelope flap;

c) tracking and transporting the envelope;

d) building a inkjet firing sequence using information comprising a flap profile, the preset horizontal resolution and preset fluid drop size; and e) moistening the glue area of the flap in accordance with the firing sequence as the flap passes the inkjet print heads.

7. The method claimed in claim 5 whereby the firing sequence is built using information comprising a flap profile, envelope position, horizontal resolution and drop size.

8. The method claimed in claim 5 whereby the firing sequence is built using information comprising a glue area profile, envelope position, horizontal resolution and drop size.

9. The method claimed in claim 5 whereby the flap is scanned to obtain a profile of the envelope glue area.

10. The method claimed in claim 6 whereby the firing sequence is built using information comprising a flap profile, envelope position, default horizontal resolution and default fluid drop size.

11. The method claimed in claim 6 whereby the firing sequence is built using information comprising a glue area profile, envelope position, horizontal resolution and drop size.

12. The method claimed in claim 6 whereby the flap is scanned to obtain a profile of the envelope glue area.

* * * * *